April 24, 1951 L. I. HILL 2,550,561
AUTOMOBILE HITCH ARRANGEMENT
Filed Nov. 5, 1948 2 Sheets-Sheet 1
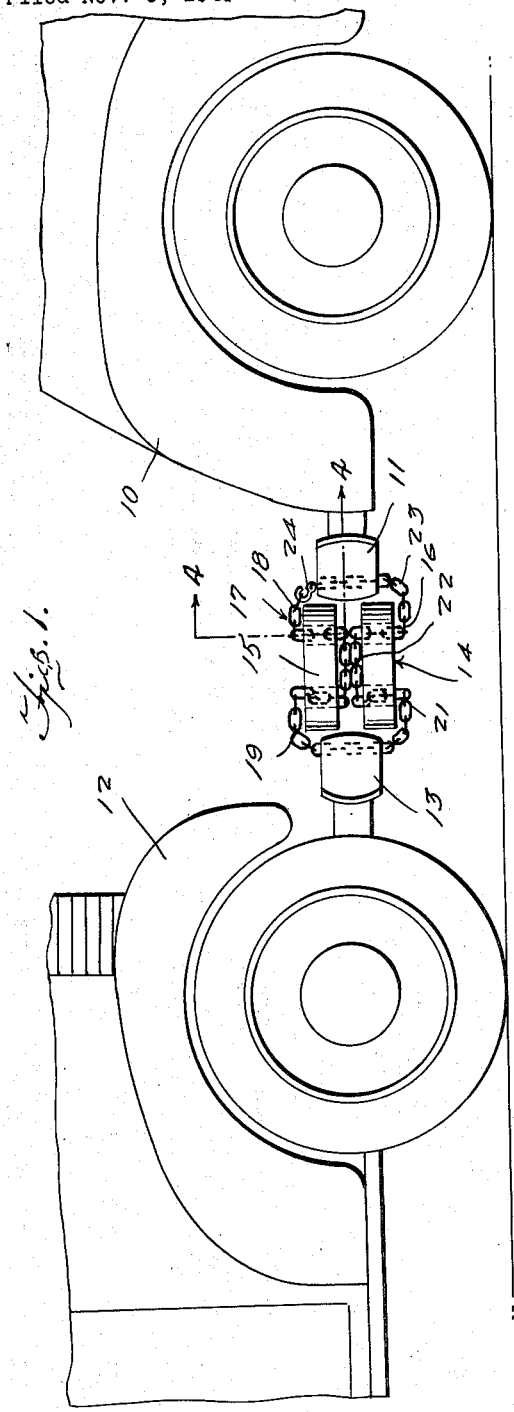
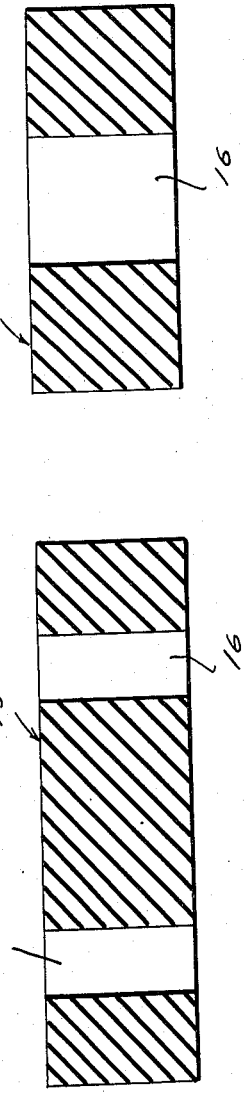
Inventor
Lucy Irena Hill

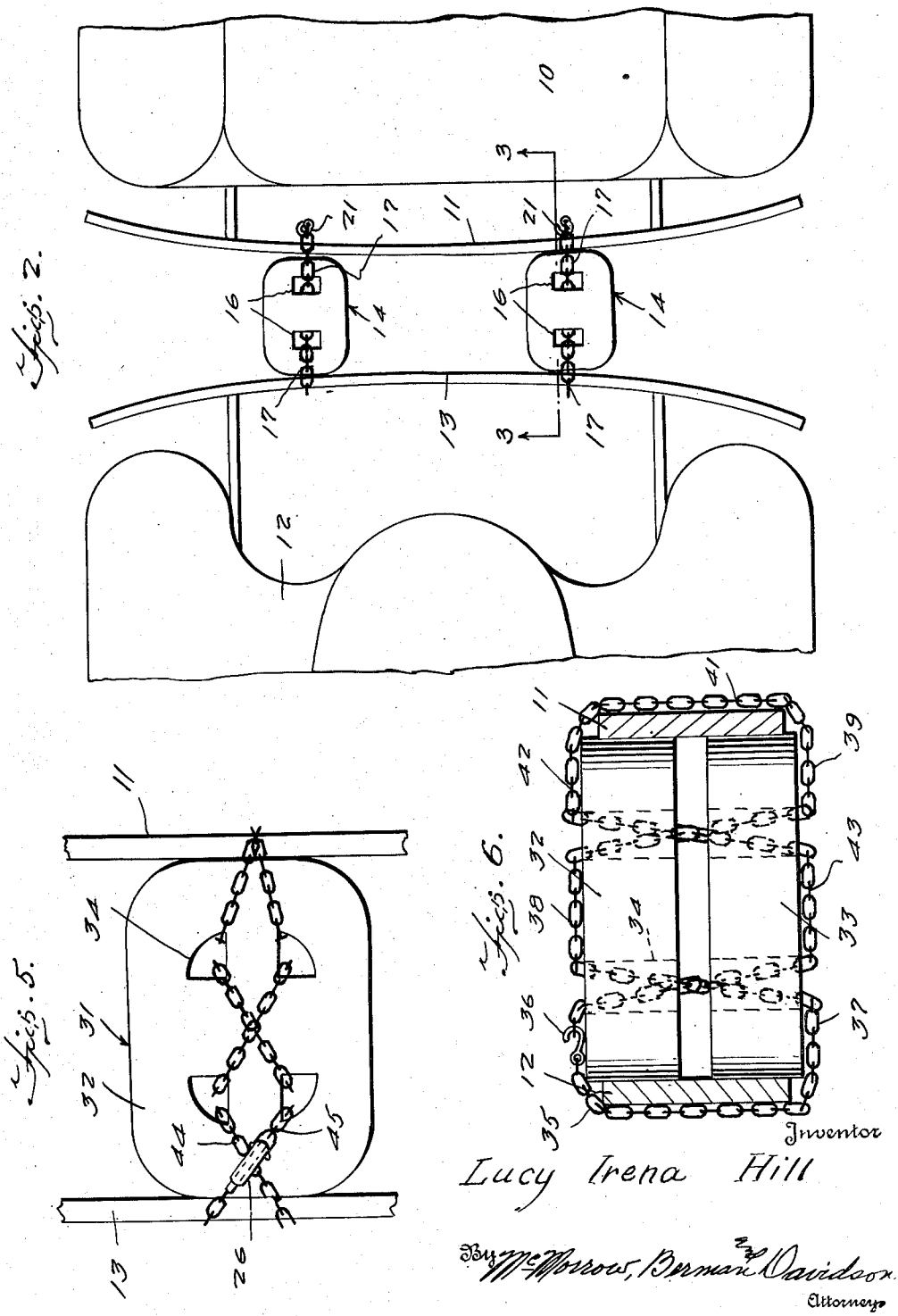

Patented Apr. 24, 1951

2,550,561

UNITED STATES PATENT OFFICE 2,550,561

AUTOMOBILE HITCH ARRANGEMENT

Lucy Irena Hill, Liberal, Kans.

Application November 5, 1948, Serial No. 58,380

2 Claims. (Cl. 280—33.14)

1

This invention relates to an automobile hitch arrangement for connecting two cars together in bumper to bumper relation.

The principal object of the present invention is to provide a simple and cheap automobile hitch device which will be adapted to be connected between bumpers of cars wherein one of the cars is to pull the other car and at times may cause the other car to be moved backwards as the one car is placed in reverse and wherein the cars will be prevented from swaying as the cars move along.

It is another object of the present invention to provide in a hitch device a resilient connection between the bumpers of the cars being moved such that the bumpers will be protected against wear such as is effected with hitch devices made of metal or other damaging material.

For other objects and for a better understanding of the invention, reference may be had to the following detailed description taken in connection with the accompanying drawings, in which:

Figure 1 is a side elevational view of the hitch device as connected between bumpers of two cars and showing a hitch device according to one form of the invention.

Figure 2 is a top plan view of the hitch devices of the form shown in Figure 1 and showing two sets of these devices laterally spaced along the bumpers.

Figure 3 is an enlarged cross sectional view taken longitudinally on one of the hitch elements and as viewed along lines 3—3 of Figure 2 and looking in the direction of the arrows thereof.

Figure 4 is a transverse cross sectional view of one of the hitch elements and as taken along line 4—4 of Figure 1 and looking in the direction of the arrows thereof.

Figure 5 shows a top plan view of a modified form of hitch device.

Figure 6 is a longitudinal side elevational view of the hitch device shown in Figure 5.

Referring now to the figures and particularly to Figures 1 to 4, 10 represents a rear portion of an automobile having a rear bumper 11. 12 represents the front portion of an automobile having a front bumper 13. It is desired that the rear automobile be connected to the forward automobile for the purpose of being towed by the forward automobile. In order to provide a good hitch connection so as to prevent to a great extent the lateral shifting of the rear automobile relative to the forward automobile, two hitch devices 14 are connected at laterally spaced positions along the bumpers 11 and 13. Each of the hitch devices 14 includes two elements 15 just alike and having longitudinally spaced openings 16 extending downwardly therethrough. These hitch elements 15 are disposed one above the other so that the holes 16 of the two hitch elements will be aligned with one another. To effect the attachment of the hitch elements 15 to the bumpers a lacing of chain is threaded about the bumpers and through the openings 16 of the elements and about portions of the elements 15 and then connected together. This lacing is shown at 17. Starting with the portion indicated at 18 the lacing may extend down through a forward hole of the upper element 15 thence rearwardly to a rearward hole of the upper element and passed upwardly thereof to be extended rearwardly as indicated at 19 to extend down about the forward member 13 of the rear car, thence forwardly as indicated at 21 to pass upwardly through a rear opening 16. From the rear opening 16 it passes forwardly as indicated at 22 and then downwardly through the forward opening 16 of the lower element so that it may pass forwardly and upwardly as indicated at 23 for connection by means of a hook 24 with the starting point 18 of the lacing. These elements 15 are made of hard rubber so that they will not mar the bumper faces.

Referring now particularly to Figures 5 and 6, a slightly different type of hitch device is used. This device is indicated generally at 31 and includes an upper element 32 and a lower element 33. Each of these elements are made of hard rubber and each of them have four holes 34 extending down through the thickness of the same and these four holes are arranged in pairs to include a forward pair and a rearward pair rearwardly spaced therefrom, the openings of the rearward pair being respectively in longitudinal alignment with the openings of the forward pair. A lacing 35 is used to connect these elements 32 and 33 to bumpers 11 and 12. Starting with a hook 36 the lacings can extend rearwardly and down over the rear side of the bumper 12 and then forwardly as indicated at 37 to pass up through one of the rear openings 34, then forwardly as indicated at 38, then downwardly through the forward openings, then forwardly as indicated at 39 and then upwardly over bumper 11 as indicated at 41 and then rearwardly as indicated at 42 to pass downwardly through one set of openings 34 and then rearwardly as indicated at 43 for passage upwardly through a rear set of openings 34, then as indicated at 44 rearwardly to again pass downwardly in rear of the bumper 12 and then upwardly through another set of rear openings to, as indicated at 45, connect with the hook 36. It would appear as shown in this hitch arrangement that by having four holes a greater crossing of the lacings can be effected. The lacings by being so crossed will help to keep the hitch elements from rotating about a longitudinal axis. The hitch devices are accordingly held rigidly between the bumpers and will be prevented from turning about their longitudinal axis.

What is claimed as new is:

1. An automobile hitch device comprising hitch elements of resilient material adapted to have their ends engaged with faces of bumpers of two cars, each of said elements having openings extending vertically therethrough and spaced from one another, the hitch elements being disposed one on top of the other and so that the openings of the hitch elements will be substantially aligned with one another, and a lacing extending around the bumpers and weaved through the opening within the hitch elements and finally connecting its ends together whereby the hitch elements will be retained against vertical displacement with respect to one another and with respect to the faces of the bumpers, each of said hitch elements having four openings extending downwardly therethrough, the four openings being arranged in pairs with one pair forwardly of the other pair and the respective openings of the pairs being in longitudinal alignment with one another, said lacing extending down through or up through all of the four openings and the lacing being crossed diagonally between diagonally disposed openings and crossed for double connection about one of the bumpers.

2. An automobile hitch device comprising a pair of hitch elements fabricated of resilient material positionable in superimposed spaced relation between bumpers of two cars to have their ends engaged with the confronting faces of said bumpers, and a lacing having one end positioned adjacent one of the bumper-engaging ends of one of said elements and having the other end extending downwardly through and out of said one element, then upwardly and out of said one element, then around one of said bumpers, then upwardly through and out of the other of said elements, then downwardly through and out of said other element, then around the other of said bumpers and connected to said one end, whereby the hitch elements will be retained against vertical displacement with respect to one another and with respect to the confronting faces of the bumpers.

LUCY IRENA HILL.

REFERENCES CITED

The following references are of record in the file of this patent:

UNITED STATES PATENTS

| Number | Name | Date |
|---|---|---|
| 1,594,305 | Lattin | July 27, 1946 |
| 2,455,140 | Roth | Nov. 30, 1948 |